United States Patent [19]
Tahhan et al.

[11] Patent Number: 5,684,680
[45] Date of Patent: Nov. 4, 1997

[54] EXTENDED RANGE SWITCH MODE POWER SUPPLY

[75] Inventors: Bishara Assad Tahhan, Kokomo; Alfred Henry Barrett, Carmel, both of Ind.

[73] Assignee: Delco Electronics Corp., Kokomo, Ind.

[21] Appl. No.: 576,825

[22] Filed: Dec. 21, 1995

[51] Int. Cl.$^6$ ................................................ H02M 3/335
[52] U.S. Cl. ............................................................. 363/26
[58] Field of Search ................................ 363/24, 25, 26, 363/97, 131

[56] References Cited

U.S. PATENT DOCUMENTS

| | | | |
|---|---|---|---|
| 3,778,677 | 12/1973 | Kriege | 315/DIG. 5 |
| 4,223,378 | 9/1980 | Koizumi | 363/26 |
| 4,885,675 | 12/1989 | Henze et al. | 363/26 |
| 5,140,513 | 8/1992 | Yokoyama | 363/26 |
| 5,181,160 | 1/1993 | Okamoto et al. | 363/97 |
| 5,295,058 | 3/1994 | Mcgreevy | 363/26 |

OTHER PUBLICATIONS

Maresca, T.J., "Regulated DC-to-DC Converter," IEEE Transaction on Magnetics, Mar. 1970.

*Primary Examiner*—Matthew V. Nguyen
*Attorney, Agent, or Firm*—Mark A. Navarre

[57] ABSTRACT

A push-pull or forward switching power supply is operable over a voltage range of 4.5 to 40 volts at high efficiency. At low voltages a primary winding or pair of windings are activated by a PWM control to regulate the output current. At high voltages, an additional primary winding in series with each of the other winding or windings is also activated by a PWM control.

4 Claims, 2 Drawing Sheets

EXTENDED RANGE SWITCH MODE POWER SUPPLY

FIELD OF THE INVENTION

This invention relates to switch mode power supplies and particularly to such power supplies operable over an extended input voltage range.

BACKGROUND OF THE INVENTION

Solid state controllers for automotive use such as engine control modules utilize power supplies which run off the vehicle battery voltage which may vary over a large range of 4.5 volts to 40 volts. Such power supplies are required to furnish a constant voltage, for example, 5.4 volts. While this is readily accomplished at nominal battery voltage of about 14 volts, there is a greater challenge to maintain the necessary output when the battery voltage covers such a great range. The power supplies previously used for this purpose have an efficiency of only about 35% and the resulting high power dissipation requires heat sinks to dissipate the energy.

Switch mode power supplies which use pulse width modulation to control a transformer output and which exhibit favorable efficiency are already known. Such power supplies, however, are effective over an input voltage range of 1:4. Thus to cover a range of 4.5 to 40 volts, two power supplies would be used: one operating from 4.5 to 10 volts and the other operating from 10 to 40 volts.

SUMMARY OF THE INVENTION

It is therefore an object of the invention to obtain DC power conversion with a single high efficiency switch mode power supply effective over an input range on the order of 1:10. Another object is the elimination of a heat sink in such a power supply.

A typical prior art push-pull switch mode power supply has a transformer with a pair of primary windings which are alternately connected to a DC source by a switch arrangement, and regulated by pulse width modulation (PWM) subject to feedback signal from the output. The input voltage range is quite limited. The invention is carried out by adding another primary winding in series with each of the first primary windings and providing a switch arrangement to alternately excite both sets of windings when the input voltage is high and only the first windings at low input voltage.

Similarly, a prior art forward switching power supply has a transformer with a single primary winding, a switch for periodically exciting the winding and the same type of PWM regulation. The invention is carried out by adding another primary winding in series with the first winding and providing a switch arrangement to excite both windings at high input voltage and only one winding at low input voltage.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
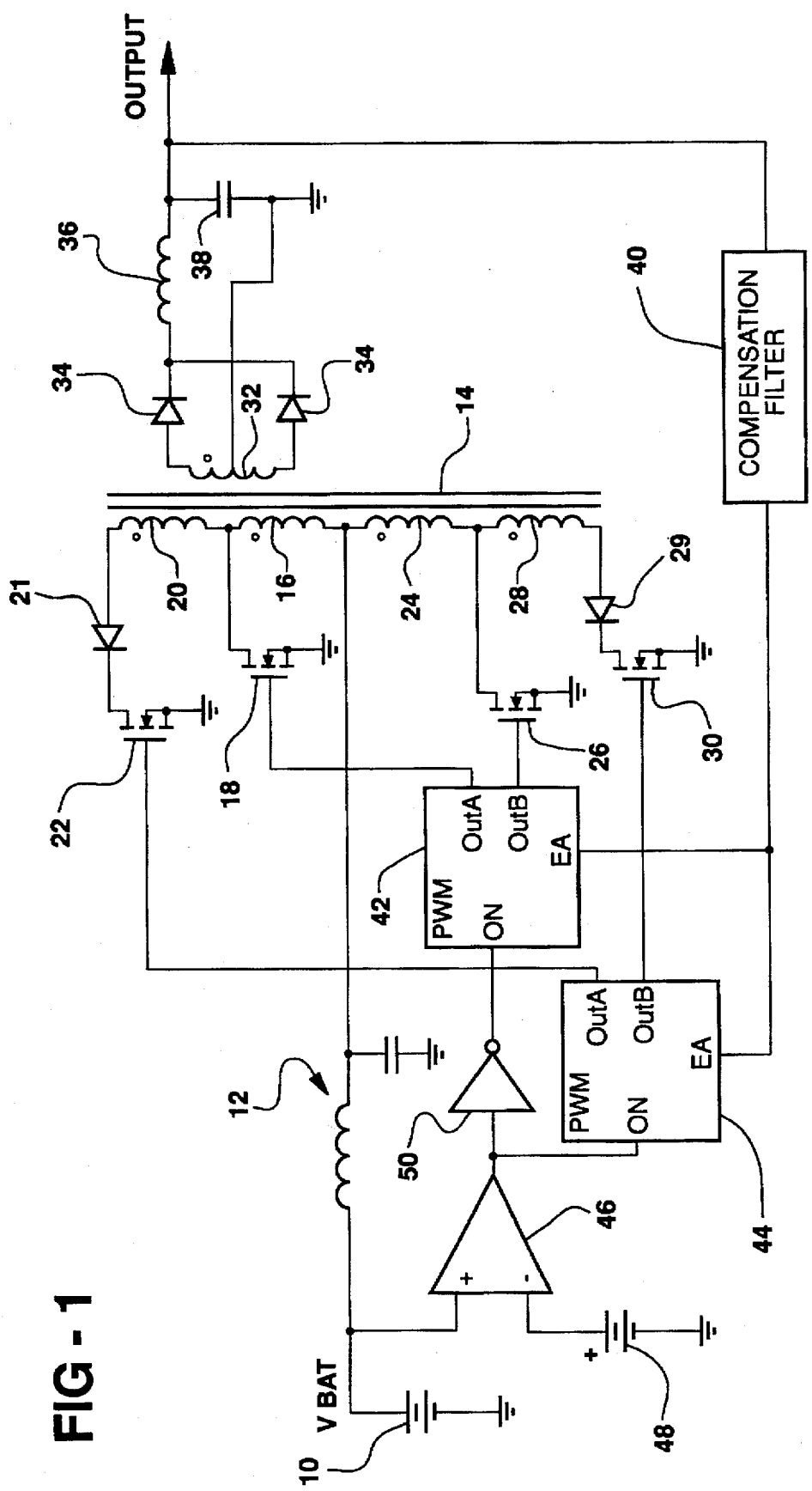
FIG. 1 is a schematic diagram of a push-pull configuration switch mode power supply according to the invention.

Referring to FIG. 1, a push-pull power supply is supplied by a vehicle battery 10 which is coupled through an LC filter 12 to the primary winding center tap of a transformer 14. The transformer has a first primary winding 16 connected at one end to the center tap and at a second end through an MOSFET 18 to ground. A second primary winding 20 is in series with the winding 16 and is connected from the second end of the winding 16 to ground via a diode 21 and an MOSFET 22. A third primary winding 24, is connected at one end to the center tap and at a second end through an MOSFET 26 to ground. A fourth primary winding 28 is in series with the winding 24 and is connected from the second end of the winding 24 to ground via a diode 29 and an MOSFET 30. The diodes 21 and 29 are used to prevent the flow of reverse current through the MOSFETs 22 and 30 when MOSFET 18 or 26 is conducting.

A transformer secondary circuit comprises a center tapped secondary winding 32, and rectifying diodes 34 at each end of the winding 32 couple the transformer current through a filtering inductor 36 to the power supply output. A filtering capacitor 38 is connected from the output to the center tap and to ground.

The power supply output is fed back through a compensation filter 40 to first and second PWM controls 42 and 44. Such controls are well known and commercially available and, when active, are responsive to the feedback to adjust the primary current pulse width to regulate the output to a desired voltage, say, 5.4 volts. The first PWM control 42 has outputs separately connected to the MOSFETs 18 and 26 for alternately turning on the MOSFETs as determined by the required pulse width, causing alternate excitation of the windings 16 and 24. The second PWM control 44 has outputs connected to the MOSFETs 22 and 30 for alternately turning on the MOSFETs as determined by the required pulse width, causing alternate excitation of the serial pair 16, 20 and the serial pair 24, 28. A comparator 46 has its positive input connected to the battery 10 and the negative input connected to a reference voltage source 48 set at about 10 volts. The comparator output is connected to an enable terminal of the PWM fan control 44 and through an inverter 50 to an enable terminal of the PWM control 42. For battery voltages below 10 volts the comparator output is low to turn off the PWM control 44 and the inverter output is high to turn on the PWM control 42. Then the MOSFETs 22 and 30 are turned off and the MOSFETs 18 and 26 are alternately turned on to excite the windings 16 and 24. The voltage levels are reversed when the battery voltage is above 10 volts so that the MOSFETs 18 and 26 are off and the MOSFETs 22 and 30 are alternately turned on to excite the series winding pairs 16, 20 and 24, 28.

In operation, at voltages between 4.5 to 10 volts, the PWM control 42 will be operative to energize the windings 16 and 24 and control the pulse width to regulate the voltage to the required value. In this mode, the power supply operates exactly as conventional prior art supplies. At voltages between 10 and 40 volts, the PWM control 44 will be operative to energize all the primary windings and control the pulse width to regulate the voltage to the required value. Thus instead of the 1:4 range of input voltage the circuit is able to operate at 1:10 range, effectively doing the job of two conventional limited range power supplies.

Due to the high efficiency on the order of 75%, relatively little heat is dissipated and a heat sink is not necessary. Thus due to the single transformer and no heat sink, the power supply package can be small and relatively inexpensive.

Figure 2:
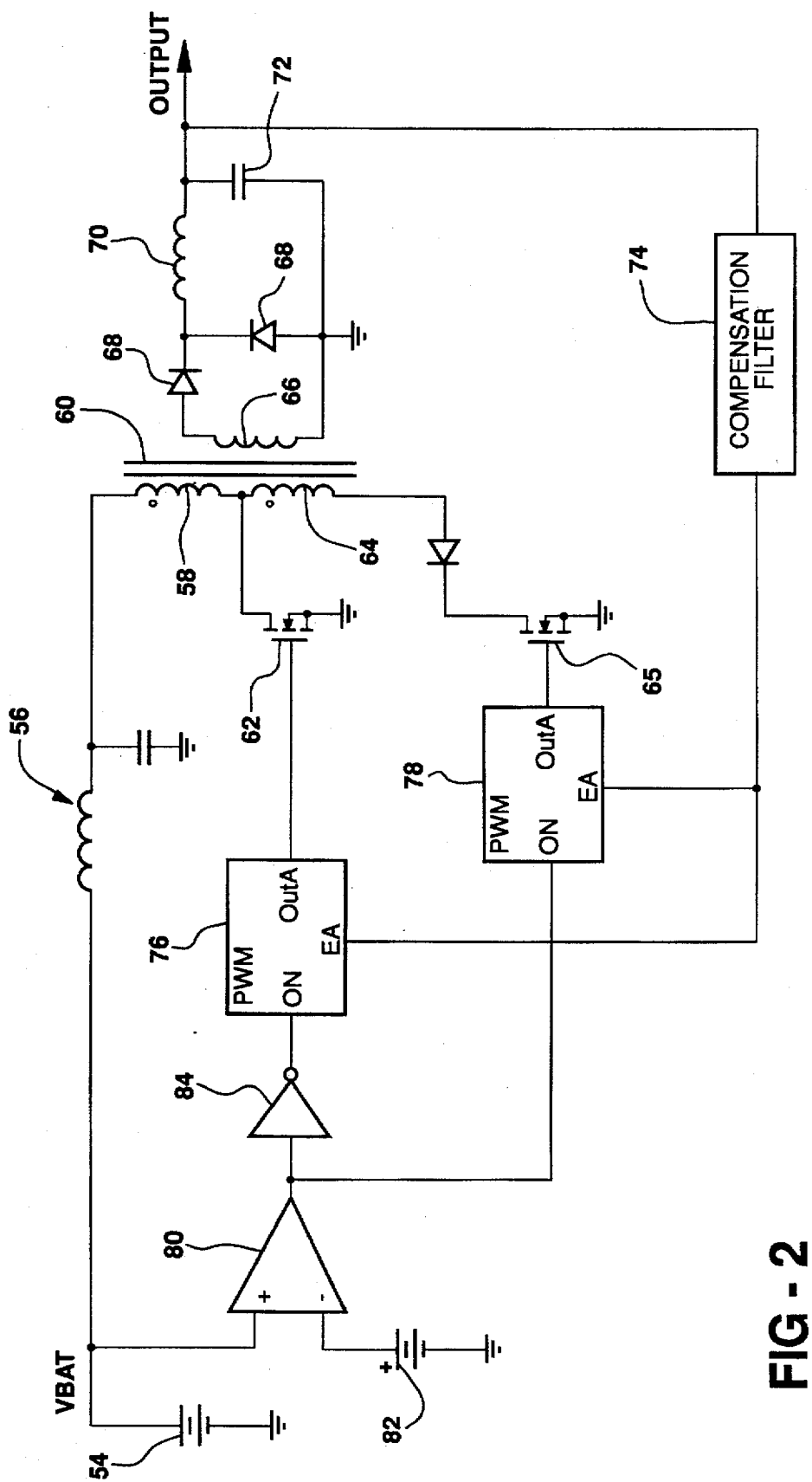
FIG. 2 is a schematic diagram of a forward configuration switch mode power supply according to the invention.

FIG. 2 shows a forward switching mode power supply having a vehicle battery 54 coupled through an LC filter 56 to one end of a primary winding 58 of a transformer 60. The second end of the primary winding 58 is coupled through a MOSFET 62 to ground. A second primary winding 64 is connected to the second end of the winding 58 and is coupled through a MOSFET 65 to ground. The transformer 60 has a single secondary winding 66 connected at both ends through diodes 68 to an inductor 70 to the output, and the output is coupled through a filter capacitor 72 to one ground and to one end of the winding 66. The output is coupled through a compensation filter 74 to form a feedback to PWM controls 76 and 78. A comparator 80 has its positive terminal coupled to the battery 54 voltage and the negative terminal coupled to a reference voltage source 82. The comparator output is connected to an enable input of the PWM control 78 and through an inverter 84 to an enable input of the PWM control 76.

In operation, at low input voltage the comparator output is low, the inverter output is high and the control 76 is activated to turn on MOSFET 62 to energize only winding 58. Conversely, at high battery voltage, the control 78 is activated to turn on MOSFET 65 to energize both windings 58 and 64. Like the push-pull configuration, the FIG. 2 circuit affords operation over the larger voltage range of 4.5 volts to 40 volts of input voltage or a range of about 1:10. The efficiency is high, no heat sink is needed, and the package is small and relatively inexpensive.

It will thus be seen that each of the embodiments described herein meet the goals of an efficient converter circuit requiring no heat sink and which has a sufficiently large input voltage range to accommodate the large swings of a vehicle battery.

The embodiments of the invention in which an exclusive property or privilege is claimed are defined as follows:

1. A switch mode power supply having a DC input voltage source, a control circuit coupled to the input voltage for exciting a transformer with pulse width modulated (PWM) current, an output circuit, and a feedback from the output circuit to the control circuit; the power supply comprising:

a first primary winding on the transformer;

a second primary winding on the transformer in series with the first winding;

the control circuit being responsive to the input voltage for exciting the first primary winding when the input voltage is in a first range and for exciting both windings when the input voltage is in a second range higher than the first range, whereby the power supply is effective over a larger range of input voltage than when only the first primary winding is excited.

2. The invention as defined in claim 1 wherein the control circuit comprises:

a comparator having inputs coupled to a reference voltage and to the input voltage for switching its output when the input voltage crosses the level of the reference voltage, thereby distinguishing between the first and second range; and PWM means coupled to the comparator output and to the first and second windings for selectively energizing the windings according to the state of the comparator.

3. The invention as defined in claim 1 wherein the power supply is a push-pull switching power supply and wherein:

the first primary winding comprises a first pair of winding sections, each coupled in series with the input voltage source and a switch controlled by the control circuit for push-pull energization when the input voltage is in the first range; and the second primary winding comprises a second pair of winding sections, each coupled in series with one of the first pair of winding sections, the input voltage source and a switch controlled by the control circuit for push-pull energization of all the winding sections when the input voltage is in the second range.

4. The invention as defined in claim 1 wherein the power supply is a forward switching power supply and wherein:

the first primary winding comprises a first single winding section which is in series circuit with the input voltage source and a switch controlled by the control circuit for forward switching operation; and the second primary winding comprises a second single winding section which is in series circuit with the input voltage source, the first single winding section and a switch controlled by the control circuit for forward switching operation.

* * * * *